United States Patent Office 3,313,837
Patented Apr. 11, 1967

3,313,837
ORGANOSILICON COMPOUNDS
Gerd Rossmy, Altendorf (Ruhr), and Götz Koerner, Mulheim (Ruhr), Germany, assignors to Th. Goldschmidt A.-G., Essen, Germany
No Drawing. Filed May 3, 1963, Ser. No. 277,681
Claims priority, application Germany, May 5, 1962, G 34,905
The portion of the term of the patent subsequent to July 6, 1982, has been disclaimed
21 Claims. (Cl. 260—448.8)

This invention generally relates to organosilicon compounds and is particularly concerned with novel 1,2-siloxaalkanes and a process for the preparation of such compounds.

In recent years, organosilicon compounds have gained importance and recognition to an ever increasing extent. Of particular importance and interest are, in this connection, compounds which may be considered formed from— partly hypothetical—monomolecular organosilicon compounds wherein the Si atom has attached thereto at least one hydroxy-substituted alkyl group and at least one directly bonded hydroxyl group. Such polyfunctional silicon compounds are capable of forming by condensation cyclic compounds of the general formula $$\diagdown Si \diagup \begin{matrix} M \\ | \\ O \end{matrix} \quad (I)$$

or polymeric compounds of linear or cyclic structure corresponding to the formula $$[-\underset{|}{Si}-M-O-]_x \quad (II)$$

In these formulas, M stands for a divalent substituted or unsubstituted hydrocarbon group, linking Si and O through at least 3 carbon atoms. Examples are: —(CH$_2$)$_3$—, —(CH$_2$)$_4$—, —CH—CH$_2$—CH$_2$— and —CH$_2$—CH—CH$_2$—
   |                              |
   CH$_3$                          CH$_3$ Several processes yielding such compounds have become known in recent years. However, these prior art processes have several serious disadvantages and shortcomings. The primary reason that the prior art processes have not been generally accepted by the industry is that the starting materials for these processes are hydroxyalkyl-silicon compounds which are not readily available. Further, the hydroxyalkyl-silicon compounds which may successfully be utilized in the prior art processes are limited to those species wherein the residual free valences of the silicon atom as indicated in the Formulas I and II above are exclusively saturated by or attached to alkyl or trialkylsilyloxy groups which are slow to react and are no longer capable of cross linking.

Accordingly, it is a primary object of this invention to overcome the shortcomings of the prior art processes by providing a process wherein readily available starting substances are reacted in an exceedingly simple manner to yield 1,2-siloxaalkanes.

Another object of this invention is to provide a process for the preparation of 1,2-siloxaalkanes in high yields.

It is also an object of this invention to provide novel 1,2-siloxaalkanes.

Another object of this invention is to provide 1,2-siloxaalkanes which have a wide utility and application for industrial use.

Generally it is an object of this invention to improve on the art of organosilicon compounds and processes for their preparation.

Briefly and in accordance with this invention, 1,2-silooxaalkanes are prepared by reacting, in the presence of a catalyst, an alkenoxy-group containing silane (A) with a silane (B) which latter has a hydrogen atom directly linked to the silicon atom and which comprises at least one halogen atom or alkoxy group. The remaining valences at the silicon atoms of the silanes (A) and (B) are saturated by hydrocarbon groups. The reaction is carried out in the presence of a catalyst suitable for causing the addition of olefinically unsaturated compounds to Si—H groups. Such catalysts are known per se. Hexachloroplatinum acid or platinum-activated carbon may be mentioned as examples for suitable catalysts.

According to a preferred embodiment, the reaction is carried out between a silane (A) of the general formula $$R_aSi(OCH_2\text{---}CH\text{=\!=}CH_2)_{4-a}$$

and a silane (B) of the general formula $$HSiR_bX_{3-b}$$

In these formulas:
R stands for a substituted or unsubstituted hydrocarbon group;
X is a halogen atom or an alkoxy group;
$a$ has a numerical value of between 0 and 3; and
$b$ has a numerical value of between 0 and 2.

Preferred meanings for R and X are methyl and chlorine, respectively. However, although methyl is the preferred R group, it should be realized that any suitable hydrocarbon group as, for example, ethyl, butyl, isobutyl, amyl, halogenbutyl, benzyl or phenyl groups may be employed.

The reaction surprisingly takes the following course:

$$R_aSi(OCH_2\text{---}CH\text{=\!=}CH_2)_{4-a} + (4-a)HSiR_bX_{3-b}$$
$$\text{I} \qquad\qquad\qquad \text{II}$$
$$\downarrow$$

$$(4-a)R_bX_{3-b}Si\diagup\!\!\diagdown\begin{matrix}(CH_2)_3\\ \\ O\end{matrix} \quad + R_aSiX_{4-a}$$
$$\text{III} \qquad\qquad\qquad \text{IV}$$

In the light of the state of the art, it should have been expected that the reaction product would correspond to a compound of the formula $$R_aSi[O(CH_2)_3SiR_bX_{3-b}]_{4-a}$$

However, apparently such compounds are not sufficiently stable and continue to react to yield the products III and IV as indicated above.

Reaction product IV is obtained as a by-product and may be removed from the reaction mixture. Such removal may be effected by distillation. In case X of Formula II described above is chlorine, it may be advantageous to effect the distillation under simultaneous passing through of HCl or under addition of pyridine. In case X is an alkoxy radical it may be advantageous to effect the distillation under addition of an alkaline catalyst, e.g. an alkalialcoholate. Upon separation of the reaction by-product IV from the main reaction product, reaction by-product IV may again be used as starting material for the preparation of the alkenoxysilane of Formula A.

The reaction is accelerated by increasing the temperature. Thus, experiments have established that the reaction is carried out with excellent yields at temperatures above 50° C. and preferably between 80 and 190° C. The reaction is often advantageously carried out in a pressure vessel or autoclave, particularly if higher temperatures are employed, since the silane of Formula IV generally exhibits a relatively low boiling point.

According to a modification of the inventive process, the silane groups necessary for carrying out the inventive reaction may be provided in a single molecule. In other words, a compound may be used which contains groups corresponding both to the silane (A) and the silane (B).

According to this modification of the inventive procedure, a silane is employed which contains an Si—H group and at least one alkenoxy group, while the valences remaining at the silicon atom may be saturated by hydrocarbon, alkoxy or halogen groups. This silane is then heated in the presence of a catalyst of the previously indicated nature, i.e. a catalyst which is suitable for causing addition of unsaturated compounds to Si—H groups.

Such silanes which contain both the groups of the silanes (A) and (B) may correspond to the formula

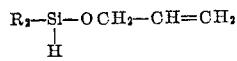

wherein R stands for a hydrocarbon group and/or an allyloxy group and/or alkoxy or chlorine, and mixtures of these groups.

The reaction with compounds which combine the groups of the silane (A) and the groups of the silane (B) in one single molecule may proceed analogous to the abovedescribed reaction course in intermolecular or intramolecular manner.

Thus, the reaction may proceed intramolecularly as follows:

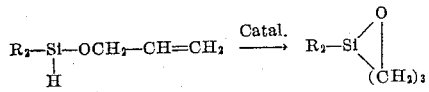

This reaction may simply be carried out by dropping the starting compound together with the catalyst into a heated vessel.

The 1,2-siloxaalkanes prepared in accordance with the process of this invention may be obtained in cyclic monomeric, in cyclic or linear polymeric form. The polymeric siloxaalkanes are usually depolymerized by heat to form the monomeric compounds. Upon distilling the siloxaalkanes, the monomeric or dimeric compound is usually first found in the distillate. This monomeric or dimeric compound is capable of again polymerizing at room temperature. However, if the distillate is maintained at low temperatures, for example if it is deposited on a cool surface, then polymerization is inhibited and the compound will remain in its monomeric or dimeric form. If the polymers are dissolved in a solvent, an equilibrium is established between the polymers with its monomers or dimers, respectively.

The inventive compounds have a wide variety of uses. Thus, for example, they are exceptionally suitable for modifying silicon resins. Further, they react with isocyanates or synthetic resins such as alkyd resins. The inventive compounds can also be incorporated in other organosilicons. This may be accomplished in a simple manner by using known equilibration catalysts.

The invention will now be described by several examples, it being understood, however, that these examples are given by way of illustration and not by way of limitation and that many changes in the choice of raw materials and process conditions in general may be effected without affecting in any way the scope and spirit of the invention as recited in the appended claims.

EXAMPLE I 0.3 ml. of an ethanolic $H_2PtCl_6$ solution containing 0.12 mole of $H_2PtCl_6$ per liter of ethanol, is admixed with 130 grams (1 mole) of trimethylallyloxysilane. The mixture thus obtained is introduced into a three-neck flask fitted with stirrer, drop funnel and cooler. A cooling medium having a temperature of $-20°$ C. flows through the cooler. The reaction mixture is heated to about 80° C. 115 grams (1 mole) of methyldichlorosilane are dropped into the reaction mixture within the course of one hour. The reaction mixtures is continuously agitated during the addition of the methyldichlorosilane. Agitation is continued for an additional ten hours. During this period, the temperature of the reaction mixture rises to about 85° C. A further amount of 0.3 ml. of $H_2PtCl_6$ solution is then added and the reaction mixture is thereafter stirred for an additional six hours at a temperature of about 85° C. The reaction product is distilled through a column. The first fraction which distills up to the boiling point of about 105° C. consists essentially of trimethylchlorosilane. The bath temperature is thereafter increased to about 250 to 300° C. A product distills over whose boiling temperature, dependent on the bath temperature, fluctuates to a certain extent, but is within the temperature range of about 140 to 200° C. The major portion of the distilled product solidifies in the receiving vessel to form large crystals. The yield is 98 grams, which corresponds to 72% of the theoretical amount calculated on 1-methyl-1-chloro-1,2-siloxacyclopentane.

*Analysis.*—Actual amount: Si, 20.4; C, 34.6; H, 7.0; Cl, 25.85. Theoretical amount: Si, 20.5; C, 35.15; H, 6.58; Cl, 26.0.

The distillate which solidifies in crystalline form consists probably of the dimeric product 1,6-dimethyl-1,6-dichloro-1,2,-6,7 - disiloxacyclodecane. These crystals, upon standing, polymerize to form a viscous liquid.

EXAMPLE II

A mixture consisting of 82 grams (0.5 mole) of triethoxysilane, 65 grams (0.5 mole) of trimethylallyloxysilane and 0.5 gram of carbon activated with 2% of Pt are stirred in an autoclave for six hours and at a temperature of 160° C. The platinum catalyst is thereafter removed by filtration and the reaction mixture is subjected to fractional distillation. The first fraction obtained at a temperature of between 72 and 93° C. weighed 45 grams and consisted mainly of trimethylethoxysilane. The second fraction of 13 grams is obtained in the temperature range of 93 to 180° C. Thereafter, at bath temperatures of between 290 and 350° C., 86 grams of 1,1-diethoxy-1,2-siloxacyclopentane distill in a boiling range of 180 to 230° C., particularly 220 to 225° C. 86 grams of the compound obtained corresponds to 75% of the theoretical amount.

*Analysis.*—Actual amount: Si, 16.2; C, 46.9; H, 9.6; ethoxy, 52.1. Theoretical amount: Si, 15.9; C, 47.7; H, 9.1; ethoxy, 51.1.

The liquid thus obtained is mobile and polymerizes upon standing to a highly viscous mass.

EXAMPLE III 135.5 grams (1 mole) of silicochloroform are added in the course of one hour to a mixture of 130 grams (1 mole) of trimethylallyloxysilane, 0.5 gram of triethylenediamine and 0.05 gram of $H_2PtCl_6 \cdot 6H_2O$. The bath temperature was about 70° C. The reaction mixture was then heated for an additional ten hours to a temperature of 70° C. The mixture was agitated during the heating. The reaction mixture partially formed a gel. The volatile components of the reaction mixture were then expelled in a water jet vacuum by heating to about 60° C. These volatile components were condensed in a cooled receiver. The distillate consisted of 105 grams of trimethylchlorosilane, the theoretical amount being 108.6 grams. The residue consisted of 345 grams of a gel-like substance. This substance constitutes substantially pure polymeric 1,1-dichloro-1,2-siloxacyclopentane. The theoretical amount would be 361 grams.

*Analysis.*—Actual amount: Si, 18.2; C, 23.2; H, 4.1; Cl, 44.0. Theoretical amount: Si, 17.9; C, 22.9; H, 3.8; Cl, 45.1.

EXAMPLE IV

1-chloro-1-phenyl-1,2-siloxacyclopentane

According to Example I, 130 grams (1 mole) of trimethylallyloxysilane are reacted with 177 grams (1 mole) of phenyldichlorosilane at a temperature of 100° C. The resulting trimethylchlorosilane is removed by distillation. The substance remaining behind consists mainly of polymeric 1-chloro-1-phenyl-1,2-siloxacyclopentane.

*Analysis.*—Actual amount: Si, 13.5%; C, 55.1%; H, 5.3%; Cl, 17.2%. Theoretical amount: Si, 14.11%; C, 54.40%; H, 5.54%; Cl, 17.89%.

EXAMPLE V

1-chloro-1-methyl-1,2-siloxacyclohexane

According to Example I, 144 grams (1 mole) of trimethyl-(2-buten-4-oxy)-silane are reacted with 155 grams (1 mole) of methyldichlorosilane and the reaction product is subjected to fractional distillation. The fraction obtained at a temperature of between 135 and 145° C. consists mainly of 1-chloro-1-methyl-1,2-siloxacyclohexane.

Yield 105 grams, which corresponds to 70% of the theory.

*Analysis.*—Actual amount: Cl, 22.9%. Theoretical amount: Cl, 23.6%.

EXAMPLE VI

1-chloro-1,4-dimethyl-1,2-siloxacyclopentane

According to Example I, 144 grams (1 mole) of trimethylmethallyloxysilane and 115 grams (1 mole) of methyldichlorosilane are reacted and distilled.

Yield 99 grams, which corresponds to 66% of the theory. Boiling range 150–220° C.

*Analysis.*—Actual amount: Si, 18.3%; C, 39.6%; H, 7.1%; Cl, 23.2%. Theoretical amount: Si, 18.60%; C, 39.87%; H, 7.31%; Cl, 23.60%.

EXAMPLE VII

1-chloro-1-methyl-1,2-siloxacyclopentane

According to Example I two tests are made, whereby 86 grams (0.5 mole) of dimethyldiallyloxysilane are reacted with 115 grams (1 mole) of methyldichlorosilane. The reactant product is subjected to fractional distillation—at first through a column— (a) by passing through a moderate flow of HCl-gas and (b) by adding 10 grams of pyridine, whereby nearly the entire dimethyldichlorosilane expected is obtained. The residue is distilled without a column, whereby there are obtained (a) 92 grams of 1-chloro-1-methyl-1,2-siloxacyclopentane, which corresponds to 67% of the theory, and (b) 98 grams of 1-chloro-1-methyl-1,2-siloxacyclopentane, which correspond to 72% of the theory. Both these products are identical with the one obtained according to Example I.

EXAMPLE VIII

1-chloro-1-methyl-1,2-siloxacyclopentane (a) *Methylallyloxychlorosilane.*—116 grams (2 moles) of allylalcohol are dropped into 230 grams (2 moles) of methyldichlorosilane whilst being cooled and stirred, whereafter the cooler is removed and the reaction product heated at 40° C. within the course of one hour and is then distilled through a column.

BP$_{760}$ 99–103° C., yield 164 grams, which corresponds to 60% of the theory.

(b) *1-chloro-1-methyl-1,2 - siloxacyclopentane.*—Whilst being stirred 136.5 grams (1 mole) of methylallyloxychlorosilane are dropped into a three-neck flash containing 0.3 ccm. of a 0.12 molar ethanolic solution of $$H_2PtCl_6 \cdot 6H_2O$$

and being in an oil bath of 120° C. At first the dropwise addition must be effected very slowly; later on it is carried out thus that the temperature of the reaction mixture, which on account of the exothermic reaction rises very quickly, does not exceed 150° C. Within 25 minutes all methylallyloxychlorosilane is dropped in. The reaction mixture is then further heated to 140° C. within the course of half an hour. According to the IR-spectrum the product is in the main identical with the one obtained according to Example I.

*Analysis.*—Actual amount: Cl, 25.5%. Theoretical amount: Cl, 26.0%.

While specific embodiments of the invention have been described in detail to illustrate the application of the principles of this invention, it will be understood that the invention may be embodied otherwise without departing from such principles.

What is claimed is:

1. Organosilicon compounds of the formula

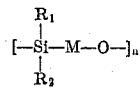

wherein $n \geq 1$,

R$_1$ is selected from the group consisting of alkyl, aryl and halogen

R$_2$ is halogen, and M stands for alkylene, linking Si and O through 3–4 carbon atoms.

2. A compound as claimed in claim 1, wherein R$_1$ is methyl and R$_2$ is chlorine.

3. A compound as claimed in claim 1, wherein R$_1$ is ethyl and R$_2$ is chlorine.

4. A compound as claimed in claim 1, wherein R$_1$ is phenyl and R$_2$ is chlorine.

5. A compound as claimed in claim 1, wherein R$_1$ is chlorine and R$_2$ is chlorine.

6. 1-chloro-1-methyl-1,2-siloxacyclohexane.

7. A process of preparing 1,2-siloxaalkanes, which comprises reacting an alkenoxy-group containing silane (A), said alkenoxy being selected from the group consisting of propene(1)oxy and butene(1)oxy, with a silane (B), said silane (B) having a hydrogen atom directly bonded to Si at least one of the remaining valences of Si being satisfied by a member selected from the group consisting of halogen and alkoxy, the remaining valences of said silanes (A) and (B) being substituted by aliphatically saturated hydrocarbon groups, said reaction being carried out in the presence of a catalyst capable of causing addition of olefinically unsaturated compounds to Si—H groups.

8. A process as claimed in claim 7, wherein said catalyst is selected from the group consisting of hexachloro platinum acid and carbon activated with platinum.

9. A process as claimed in claim 7, wherein said reaction is carried out at a temperature of about between 50 to 190° C.

10. A process of preparing 1.1-siloxaalkanes which comprises reacting a silane (A) of the general formula $$R_aSi(OCH_2-CH=CH_2)_{4-a}$$

with a silane (B) of the general formula $$HSiR_bX_{3-b}$$

wherein R stands for an aliphatically saturated hydrocarbon group, X is selected from the group consisting of halogen and alkoxy, $a$ has a numerical value of from 0 to 3 and $b$ has a numerical value of from 0 to 2, said reaction being carried out in the presence of a catalyst capable of causing addition of olefinically unsaturated compounds to Si—H groups.

11. A process as claimed in claim 10, wherein R is methyl.

12. A process as claimed in claim 10, wherein R is methyl and X is chlorine.

13. A process as claimed in claim 10, wherein said silanes (A) and (B) are reacted according to the formula

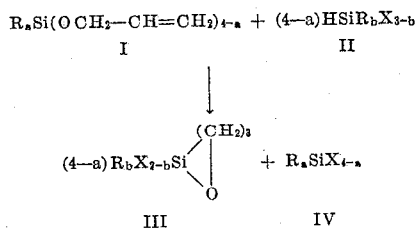

and wherein the reaction Product IV is removed by distillation.

14. A process as claimed in claim 13, wherein X=Cl and the removal of said reaction Product IV is facilitated by passing hydrochloric acid through the reaction mixture.

15. A process of preparing 1,2-siloxaalkanes which comprises heating a silane containing an Si—H group and at least one alkenoxy group selected from the group consisting of propene(1)oxy and butene(1)oxy, the residual valences of the Si atom of the silane being satisfied by members selected from the group consisting of aliphatically saturated hydrocarbon groups, alkoxy, allyloxy halogen and mixtures thereof, said heating being effected in the presence of a catalyst capable of causing addition of unsaturated compounds to Si—H groups.

16. A process as claimed in claim 15, wherein said silane corresponds to the formula

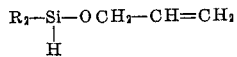

wherein R is selected from the group consisting of aliphatically saturated hydrocarbon groups, allyloxy, alkoxy, halogen, and mixtures thereof.

17. A process as claimed in claim 13, wherein X=Cl and the removal of said reaction Product IV is facilitated by adding pyridine to the reaction mixture.

18. Compounds of the unit formula

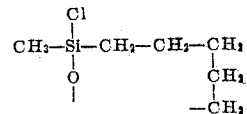

19. Polymers of the unit formula

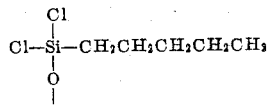

20. Polymers of the unit formula

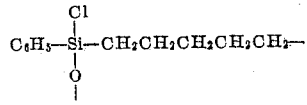

21. Compounds of the unit formula

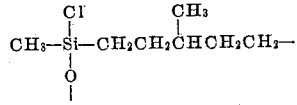

References Cited by the Examiner
UNITED STATES PATENTS

| | | | |
|---|---|---|---|
| 2,486,162 | 10/1949 | Hyde | 260—448.2 |
| 2,711,417 | 6/1955 | Frisch | 260—448.8 |
| 2,906,735 | 10/1959 | Speier | 260—448.2 |
| 2,967,171 | 1/1961 | Barnes et al. | 260—448.8 |
| 2,983,744 | 5/1961 | Knoth | 260—448.8 |
| 2,983,745 | 5/1961 | Speier | 260—448.8 |

TOBIAS E. LEVOW, *Primary Examiner.*

SAMUEL H. BLECH, *Examiner.*

P. F. SHAVER, *Assistant Examiner.*